US008757388B2

(12) United States Patent
Leist

(10) Patent No.: US 8,757,388 B2
(45) Date of Patent: Jun. 24, 2014

(54) BIOMASS CONDITIONING SYSTEM AND METHOD FOR CONDITIONING

(75) Inventor: James R. Leist, Columbus, MS (US)

(73) Assignee: Weyerhaeuser NR Company, Federal Way, WA (US)

( * ) Notice: Subject to any disclaimer, the term of this patent is extended or adjusted under 35 U.S.C. 154(b) by 893 days.

(21) Appl. No.: 12/698,315

(22) Filed: Feb. 2, 2010

(65) Prior Publication Data

US 2011/0186481 A1    Aug. 4, 2011

(51) Int. Cl.
*B03B 5/60* (2006.01)
*B03B 5/64* (2006.01)
*B03D 1/00* (2006.01)

(52) U.S. Cl.
USPC .......................................... 209/163; 209/3.1

(58) Field of Classification Search
USPC .................................................... 209/163, 3.1
See application file for complete search history.

(56) References Cited

U.S. PATENT DOCUMENTS

| | | | | |
|---|---|---|---|---|
| 658,486 | A * | 9/1900 | Champness | 366/65 |
| 1,537,947 | A * | 5/1925 | Humphrey | 209/496 |
| 2,211,575 | A * | 8/1940 | Mjolsness | 209/21 |
| 2,345,513 | A * | 3/1944 | Trostler et al. | 209/172.5 |
| 2,469,197 | A * | 5/1949 | Hermann | 210/525 |
| 2,486,682 | A * | 11/1949 | Ridley | 209/172.5 |
| 2,489,161 | A * | 11/1949 | Scholes | 209/173 |
| 2,666,711 | A * | 1/1954 | Crosset | 426/506 |
| 2,713,945 | A * | 7/1955 | Fontein | 209/172.5 |
| 2,874,908 | A * | 2/1959 | Heritage | 241/24.2 |
| 2,918,701 | A * | 12/1959 | Schrader et al. | 264/142 |
| 3,032,188 | A | 5/1962 | Wesner | |
| 3,042,198 | A | 7/1962 | Slavich | |
| 3,042,208 | A * | 7/1962 | Holmes | 209/442 |
| 3,367,495 | A | 2/1968 | Lea et al. | |
| 3,664,951 | A * | 5/1972 | Armstrong | 210/707 |
| 3,765,532 | A | 10/1973 | Morris et al. | |
| 3,804,251 | A * | 4/1974 | Farrell et al. | 210/776 |
| 3,840,120 | A | 10/1974 | Greenberg | |
| 3,980,559 | A | 9/1976 | Netzell | |
| 3,981,453 | A * | 9/1976 | Berlyn et al. | 241/21 |
| 4,036,440 | A | 7/1977 | Makila et al. | |
| 4,135,907 | A | 1/1979 | Houser et al. | |

(Continued)

OTHER PUBLICATIONS

Bissen, David; Zachry Engineering Corporation, "Biomass Densification Document of Evaluation" Jul. 13, 2009, Minneapolis, MN, US.

(Continued)

*Primary Examiner* — Stefanos Karmis
*Assistant Examiner* — Michael E Butler
(74) *Attorney, Agent, or Firm* — Woodcock Washburn LLP

(57) ABSTRACT

The disclosure is directed generally a biomass conditioning system and methods for conditioning biomass to remove undesirable material for further processing and applications. In some embodiments, the disclosure includes a biomass conditioning system including a conditioning tank, a water input device, a biomass input device, a containment device, a spillway, and a moving separation device. In some embodiments, methods according to the disclosure include pumping water into a conditioning tank, depositing biomass into the conditioning tank, allowing the biomass to soak in the water and separate into a bark portion and a non-bark portion, allowing the bark portion to float to a water line, containing the bark portion to one side of the conditioning tank, moving the bark portion into a bark storage area, separating the non-bark portion into a biomass portion and a debris portion, and moving the conditioned biomass portion into a storage area.

15 Claims, 8 Drawing Sheets

(56) References Cited

U.S. PATENT DOCUMENTS

| | | | |
|---|---|---|---|
| 4,235,707 A * | 11/1980 | Burke, Jr. | 209/3 |
| 4,395,265 A | 7/1983 | Reilly et al. | |
| 4,551,246 A * | 11/1985 | Coffing | 210/221.2 |
| 4,599,091 A | 7/1986 | Lee et al. | |
| 4,849,116 A * | 7/1989 | Weinmann et al. | 210/770 |
| 4,865,720 A * | 9/1989 | Gilmore | 209/12.1 |
| 5,666,890 A | 9/1997 | Craig | |
| 5,863,441 A * | 1/1999 | Krofta | 210/703 |
| 6,327,994 B1 * | 12/2001 | Labrador | 114/382 |
| 6,406,624 B1 * | 6/2002 | DeVos | 210/208 |
| 6,531,886 B1 * | 3/2003 | Eichfeld et al. | 326/21 |
| 6,620,292 B2 | 9/2003 | Wingerson | |
| 6,685,830 B2 | 2/2004 | Hartleitner et al. | |
| 6,743,358 B1 | 6/2004 | Lundback | |
| 7,503,981 B2 | 3/2009 | Wyman et al. | |
| 2003/0221363 A1 | 12/2003 | Reed | |
| 2006/0112638 A1 | 6/2006 | Suyama et al. | |
| 2007/0091716 A1 * | 4/2007 | Zeikus | 366/104 |
| 2012/0199519 A1 * | 8/2012 | Ward | 209/3.1 |

OTHER PUBLICATIONS

Shaw, Mark; "Feedstock and Process Variables Influencing Biomass Densification", Department of Agricultural and Biosource Engineering, University of Saskatchewan, Mar. 2008, Saskatoon, Saskatchewan, Canada.

FLO-CAIT, downloaded 2009 from http://www.flocait.com/.

* cited by examiner

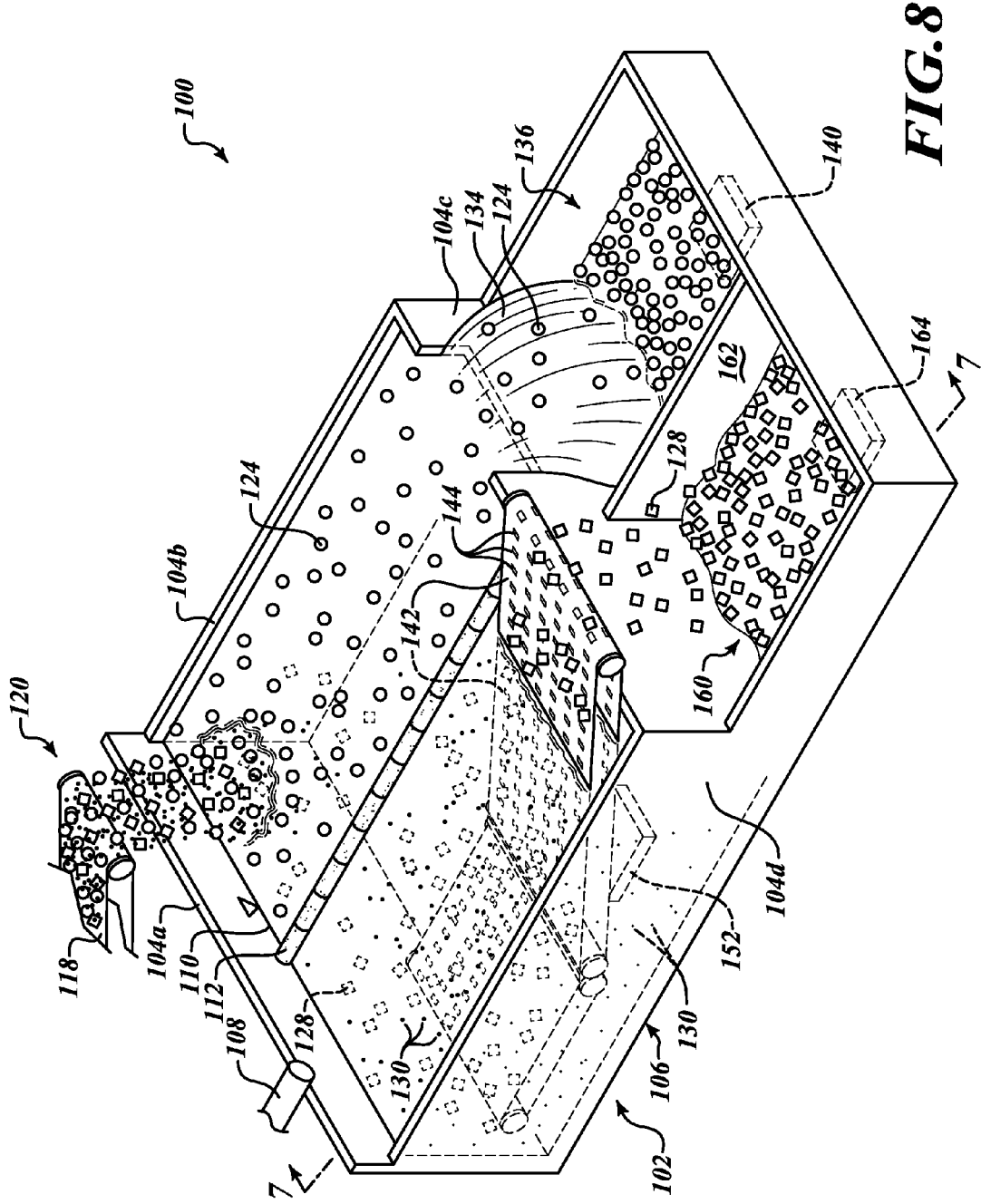

BIOMASS CONDITIONING SYSTEM AND METHOD FOR CONDITIONING

TECHNICAL FIELD

The present disclosure is directed generally to a biomass conditioning system and methods for conditioning biomass to remove undesirable material in preparation for further processing and applications.

BACKGROUND

Due to diminishing quantities of coal, petroleum, and natural gas products, attention is being directed to other energy sources, including oil shale, solar energy, and nuclear energy. One source receiving considerable attention is biomass materials such as wood and its byproducts. Biomass has the potential for use in countless different applications including generating heat, production of liquid fuel, production of biogas, generating bioelectricity, and production of feedstock for chemicals and other materials.

Forest biomass includes any type of biomass produced by forest growth such as dead trees, non-merchantable trees, branches, understory, tree stumps, interplanted crops, other plants, clippings, logging residue, stems, wood chips, or other similar material. Forest biomass often contains undesirable material such as bark, silt, leaves, sand, needles, and dirt, which may cause problems during further processing. For example, in one type of heating and power application, biomass is typically densified (e.g., formed into pellets or briquettes) for burning in stoves. Sand and dirt in the biomass may reduce the service life of chipper components and pelletizing dies used in the densification process. Additionally low bark content is generally preferred for densification processes in order to minimize ash content.

The presence of undesirable materials may also cause problems in other biomass applications. Cellulosic ethanol, for example, is a type of biofuel which can be produced using either biochemical or thermochemical techniques. Regardless of which approach is used, the presence of dirt, silt, and other non-cellulosic materials may reduce the effectiveness of the process.

In addition to the examples discussed above, there are a number of other biomass applications in which the presence of undesirable materials may pose challenges. Thus, cleaning and conditioning biomass may be useful in many applications. As technologies for utilizing biomass become more sophisticated, the number and value of potential applications continues to grow. Thus, there is a need to develop a biomass conditioning system and methods for conditioning biomass to remove undesirable material in preparation for further processing.

SUMMARY

The following summary is provided for the benefit of the reader only and is not intended to limit in any way the invention as set forth by the claims. The present disclosure is directed generally towards a biomass conditioning system and methods for conditioning biomass to remove undesirable material in preparation for further processing and applications. Applications within the scope of this disclosure include, for example, heat generation, production of liquid fuel, production of biogas, bioelectricity generation, and production of feedstock for chemicals and other materials.

In some embodiments, the disclosure includes a biomass conditioning system including a conditioning tank, a water input device, a biomass input device, a containment device, a spillway, and a moving separation device. Biomass is immersed in the water, thereby causing it to separate into a floating portion (e.g., bark) and a non-floating portion (e.g. biomass and debris). The containment device contains the floating portion of the biomass in a first side. The spillway transfers the floating portion of the biomass to a first storage area. The non-floating portion is further separated into conditioned biomass and debris by the moving separation device.

Further aspects of the disclosure are directed towards methods for conditioning biomass. In some embodiments, methods according to the disclosure include the steps of providing a conditioning tank; pumping water into the conditioning tank, thereby establishing a water line; depositing biomass into the conditioning tank; allowing the biomass to soak in the water and separate into a bark portion and a non-bark portion; allowing the bark portion to float to the water line; containing the bark portion in one side of the conditioning tank; moving the bark portion via a spillway into a bark storage area; separating the non-bark portion into a conditioned biomass portion and a debris portion; and moving the conditioned biomass portion into a conditioned biomass storage area.

BRIEF DESCRIPTION OF THE DRAWINGS

The present disclosure is better understood by reading the following description of non-limitative embodiments with reference to the attached drawings wherein like parts of each of the figures are identified by the same reference characters, and are briefly described as follows:

FIG. 8 is a three-dimensional view of the biomass conditioning system from FIG. 7.

DETAILED DESCRIPTION

The present disclosure describes a biomass conditioning system and methods for conditioning biomass to remove undesirable material in preparation for further processing and applications. Certain specific details are set forth in the following description and FIGS. 1-8 to provide a thorough understanding of various embodiments of the disclosure. Well-known structures, systems, and methods often associated with such systems have not been shown or described in details to avoid unnecessarily obscuring the description of various embodiments of the disclosure. In addition, those of ordinary skill in the relevant art will understand that additional embodiments of the disclosure may be practiced without several of the details described below.

In this disclosure, the term "biomass" is used to refer to a renewable energy source that is a biological material derived from living or recently living organisms. More specifically, the term "biomass" is used to describe any type of material produced by forest growth such as dead trees, non-merchantable trees, branches, understory, tree stumps, clipping, logging residue, stems, wood chips, or other similar material. The term "debris" is used to refer any portion of the biomass that is not cellulosic, including but not limited to silt, leaves, sand, needles, and dirt. Debris refers to material which is generally undesirable in biomass applications.

Figure 1:
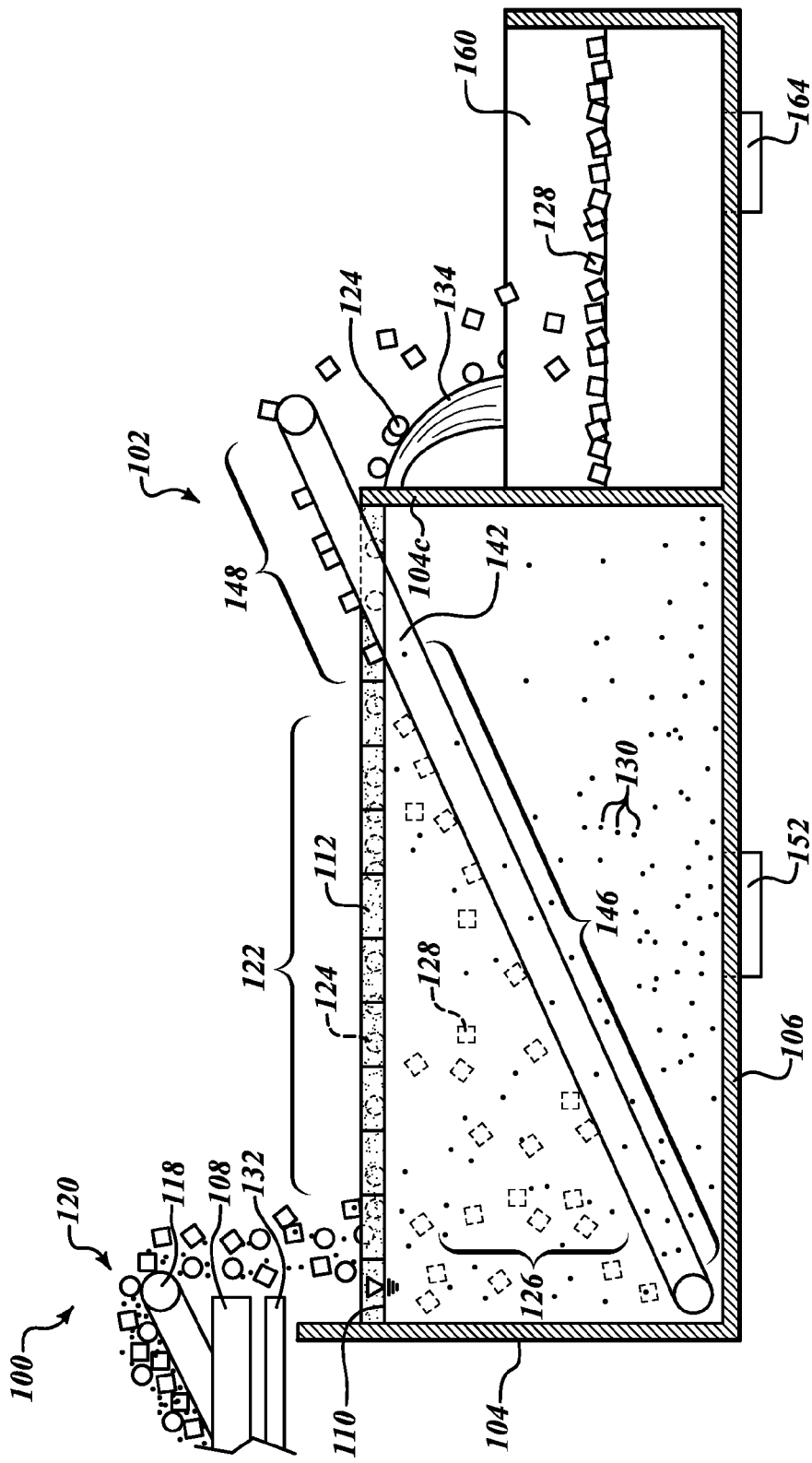
FIG. 1 is a side view of biomass conditioning system in accordance with embodiments of the disclosure.
Figure 2:
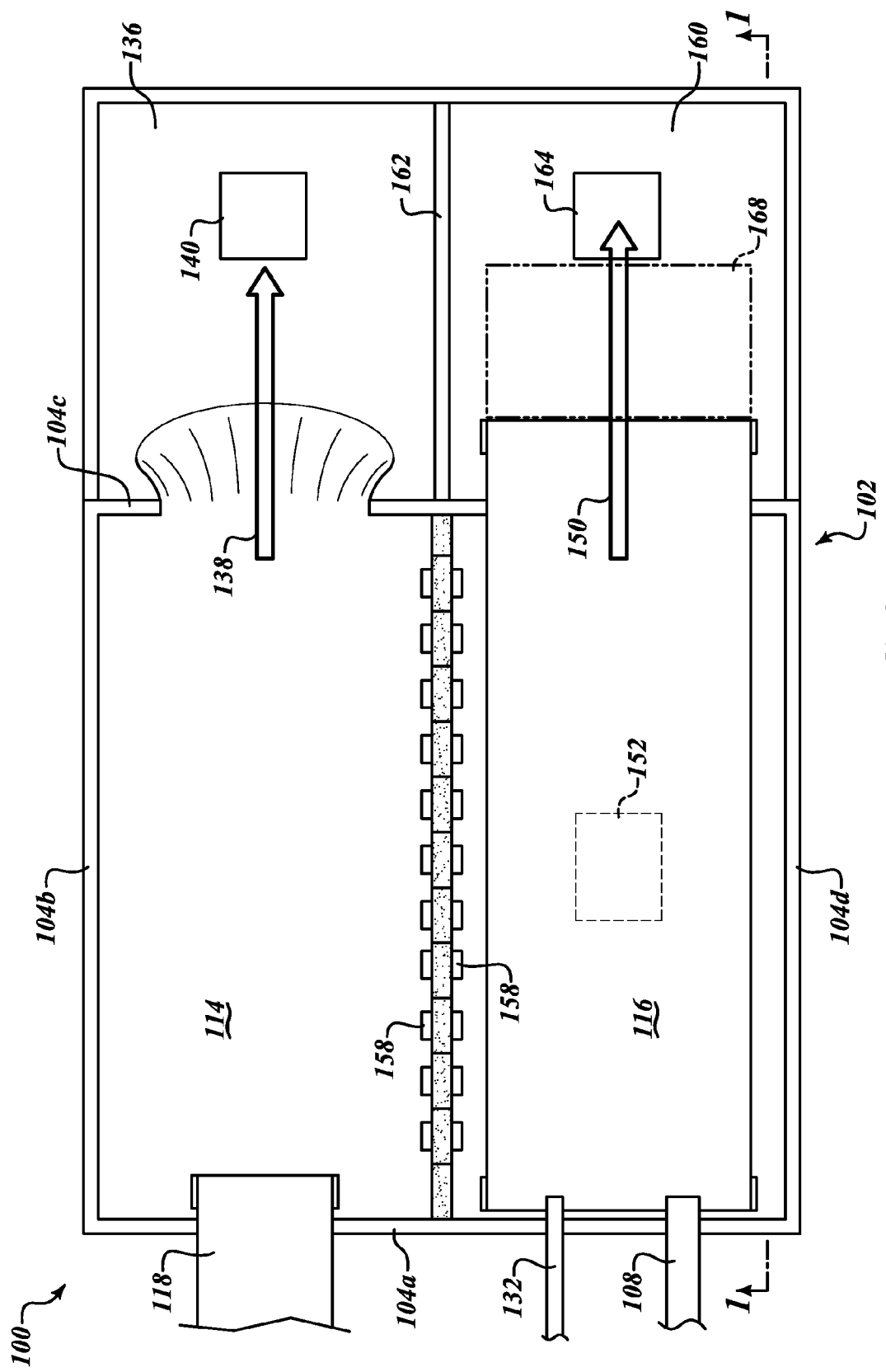
FIG. 2 is top view of the biomass conditioning system from FIG. 1.
Figure 3:
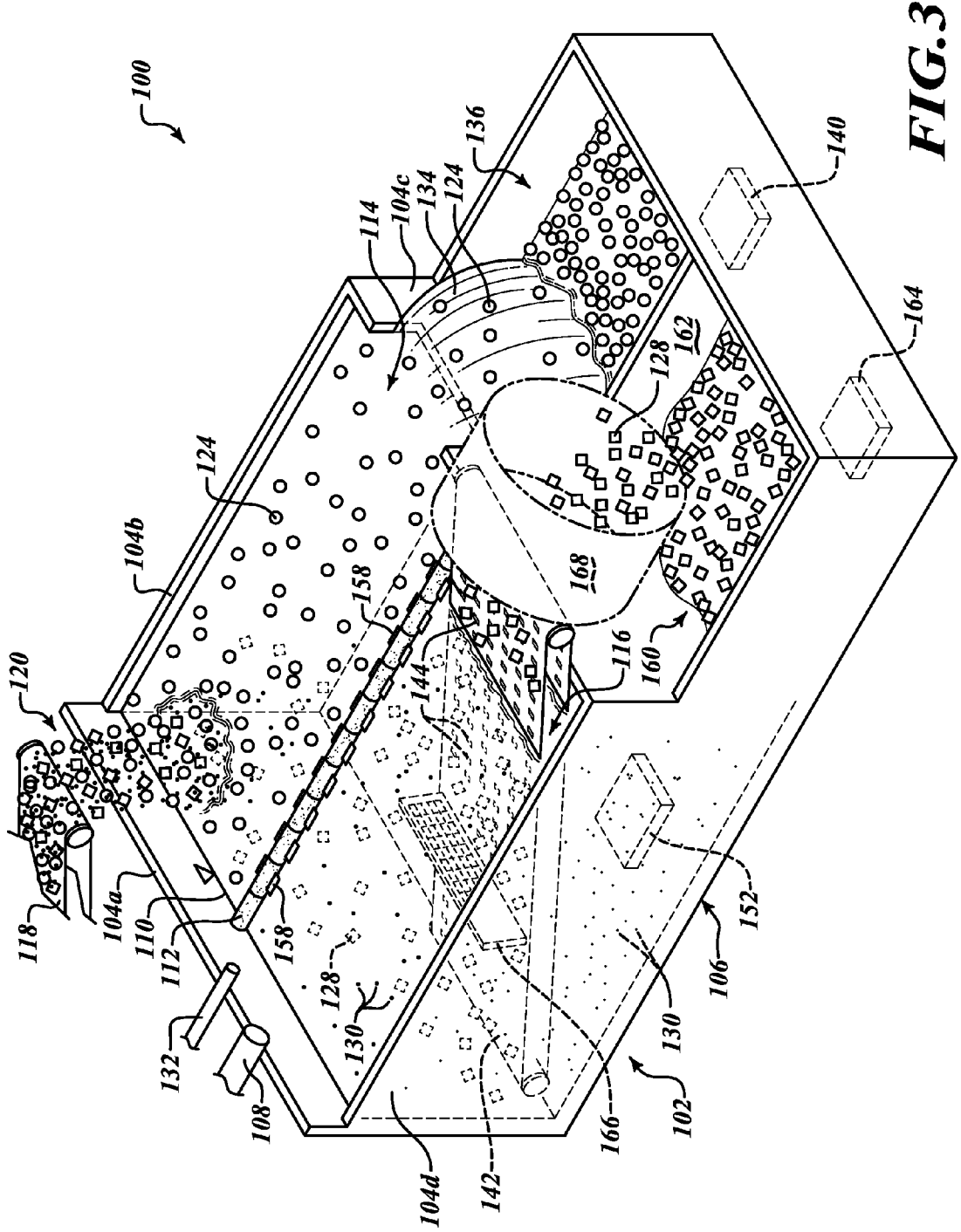
FIG. 3 is a three-dimensional view of the biomass conditioning system from FIG. 1.
Figure 4:
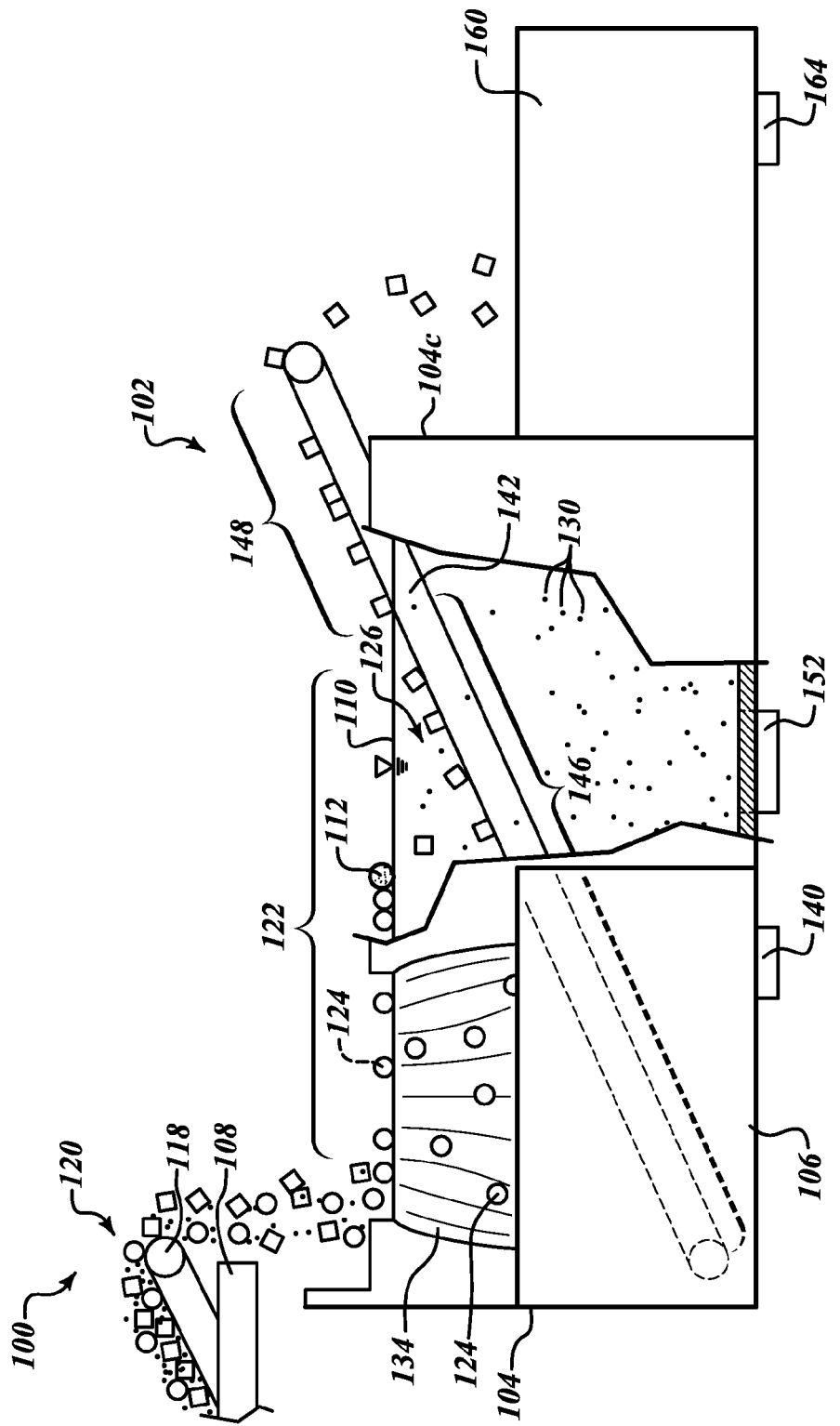
FIG. 4 is a side view of another biomass conditioning system according to embodiments of the disclosure.
Figure 5:
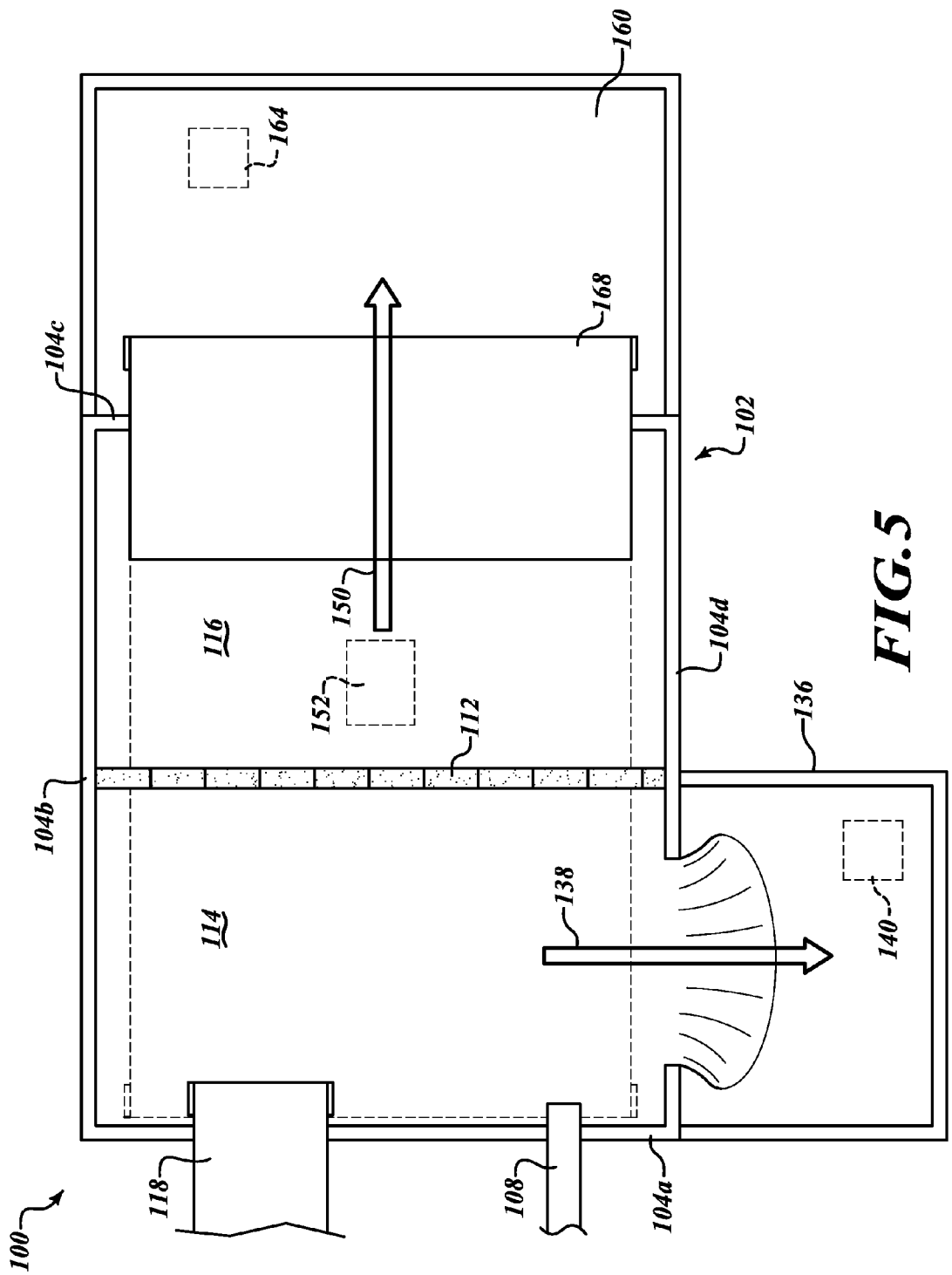
FIG. 5 is top view of the biomass conditioning system from FIG. 4.
Figure 6:
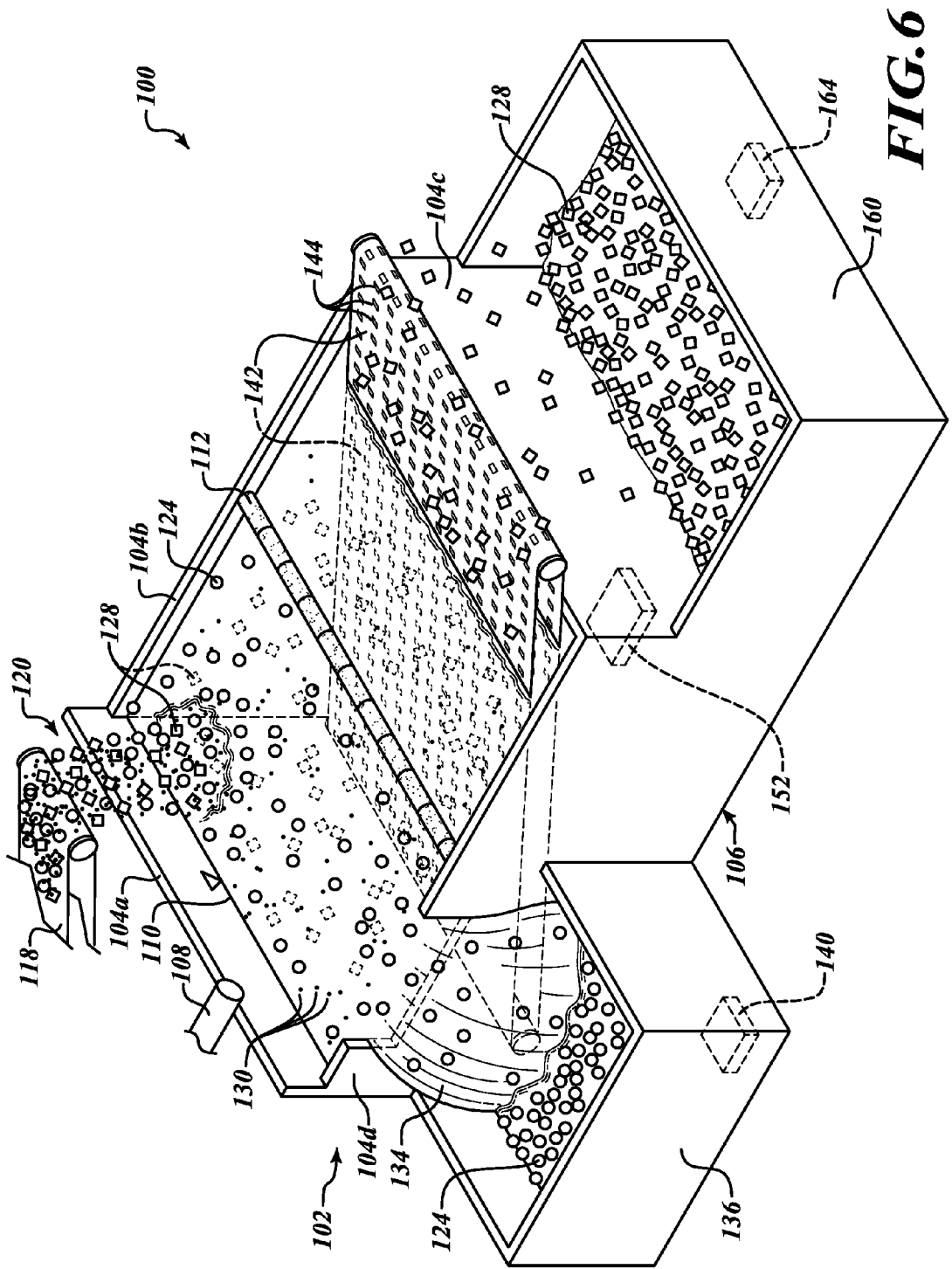
FIG. 6 is a three-dimensional view of the biomass conditioning system from FIG. 4.
Figure 7:
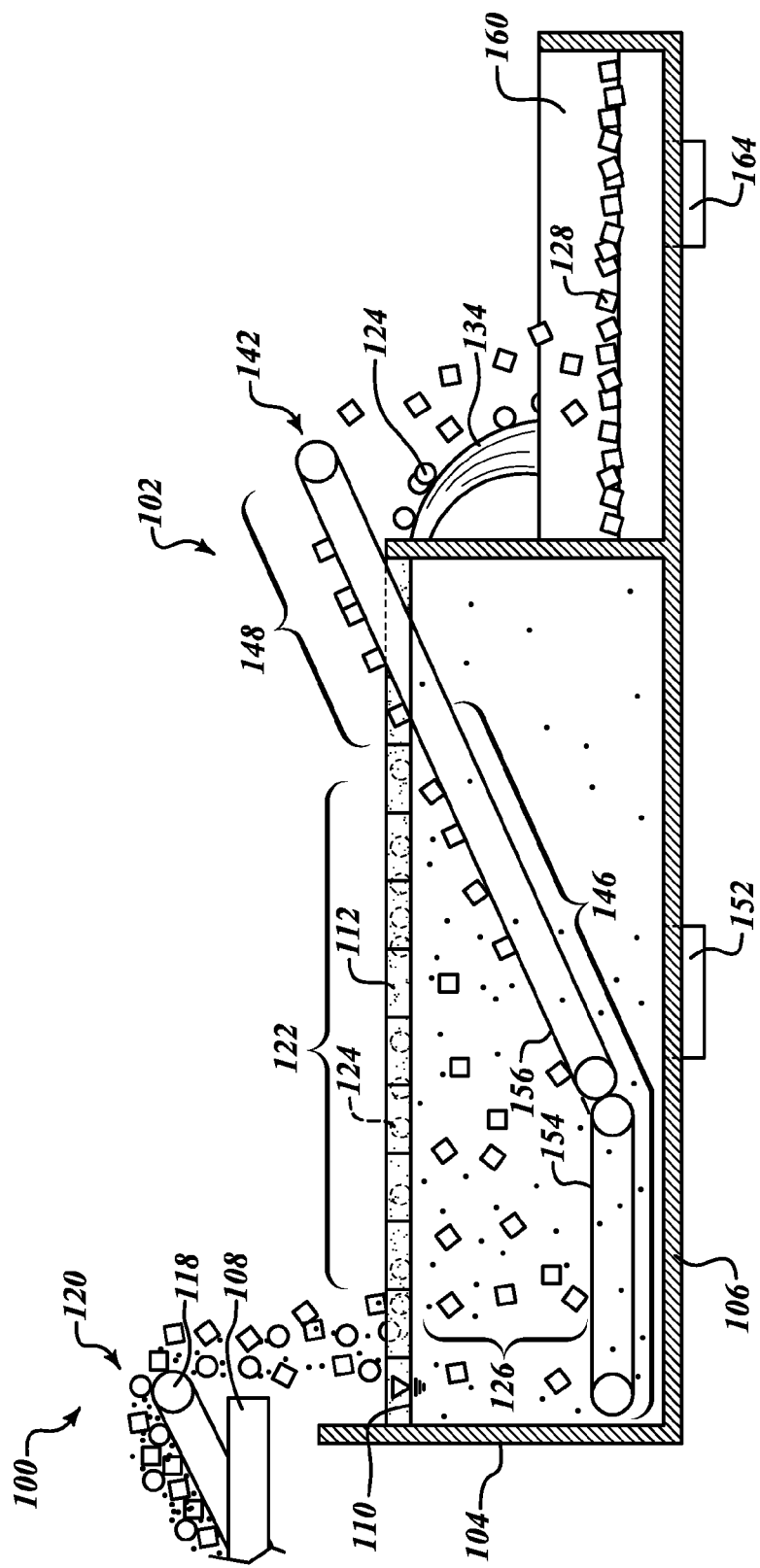
FIG. 7 is a side view of yet another biomass conditioning system according to embodiments of the disclosure.

Referring to FIGS. 1-8, a biomass conditioning system 100 is shown. FIGS. 1, 4, and 7 are side views of embodiments according to the disclosure; FIGS. 2 and 5 are tops views of embodiments according to the disclosure; and FIGS. 3, 6, and 8 are three-dimensional views of embodiments according to the disclosure. The biomass conditioning system includes a conditioning tank 102 having a wall portion 104 and a bottom portion 106. In FIGS. 2, 3, 5, 6, and 8, the wall portion 104 is shown to include four walls: a first wall 104a, a second wall 104b, a third wall 104c, and a fourth wall 104d. The Figures depict the first, second, third, and fourth walls (104a, 104b, 104c, and 104d) as being substantially perpendicular to the bottom portion 106 of the conditioning tank 102; however, one or more walls may be slanted, curved, or otherwise modified in configuration or shape. In other embodiments, the conditioning tank 102 may have a number of walls other than four. Although FIGS. 2 and 5 show the conditioning tank 102 as having a substantially rectangular shape when viewed from the top, the disclosure is intended to include conditioning tanks having other shapes. For example, the conditioning tank may have a substantially cylindrical shape and a single wall.

The biomass conditioning system 100 further includes a water input device 108 which pumps water into the conditioning tank 102. The water input device 108 may be, for example, a hose, valve, or any other suitable mechanism known to a person of ordinary skill in the art for moving water. The Figures show the water input device being located on the first wall 104a of the conditioning tank 102; however, other configurations are envisioned to be within the scope of this disclosure. The water input device 108 fills the conditioning tank 102 with water creating a water line 110.

The size of the conditioning tank 102 may be determined by the capacity of the facility in which it is used. This may vary substantially based on the type of biomass application in which the system 100 is implemented. In some applications, the conditioning tank may hold as much as 450,000 gallons of water. The width of the conditioning tank 102 may range anywhere from about 10 feet to about 30 feet. The length of the conditioning tank may range anywhere from about 40 feet to about 120 feet. The depth of the conditioning tank may range anywhere from about 2 feet to about 15 feet.

A containment device 112 divides the conditioning tank 102 into a first side 114 and a second side 116. In FIGS. 1-8, the containment device 112 is a divider that floats at the water line 110, extending from the first wall 104a to the third wall 104c. In FIGS. 1-3, 7, and 8, the containment device 112 is shown extending from the first wall 104a to the third wall 104c. In FIGS. 4, 5, 6, the containment device 112 is shown extending from the second wall 104b to the fourth wall 104d. In other embodiments, the containment device 112 may extend to the bottom portion 106 of the conditioning tank 102. Further, the disclosure is intended to include different types of containment devices that may be known to a person of ordinary skill in the art.

A biomass input device 118 deposits biomass 120 into the conditioning tank 102. The biomass 120 may include different proportions of cellulosic material and debris. When the biomass 120 is submerged in the water, it naturally separates into a floating portion 122 (e.g., the bark 124) and a non-floating (or non-bark) portion 126 (e.g., conditioned biomass 128 and debris 130). The floating portion 122 will float to the water line 110 and the non-floating portion 126 will either sink or remain in suspension in the water. Some embodiments of the disclosure (e.g., FIGS. 1, 2, and 3) may include a surfactant dispensing device 132. The surfactant dispensing device 132 dispenses a surfactant that reduces the surface tension in the water. This may aid in separation of the biomass 120. Examples of surfactants which are suitable for use with embodiments of the disclosure include but are not limited to foaming agents (e.g., soap), emulsifiers, and dispersants.

The floating portion 122 of the biomass 120 is contained in the first side 116 of the conditioning tank 102 by the containment device 112. FIGS. 2 and 5 illustrate the division between the first side 114 and second side 116 most clearly. In FIG. 2, the first side 114 is bounded by the second wall 104b, a portion of the first wall 104a, a portion of the third wall 104c, and the containment device 112. The second side 116 is bounded by the fourth wall 104d, a portion of the first wall 104a, a portion of the third wall 104c, and the containment device 112. In FIG. 5, the first side 114 is bounded the first wall 104a, a portion of the second wall 104b, a portion of the fourth wall 104d, and the containment device 112. The second side 116 is bounded the third wall 104c, a portion of the second wall 104b, a portion of the fourth wall 104d, and the containment device 112. In addition, other configurations of boundaries for the first side 114 and second side 116 are within the scope of this disclosure.

A spillway 134 located on the first side 114 of the conditioning tank 102 may be used to transfer the floating portion 122 of the biomass 120 into a first storage area 136. The movement of the floating portion 122 of the biomass 120 is indicated in FIGS. 2 and 5 by an arrow 138. In the embodiments shown in FIGS. 1, 2, 3, 7, and 8, the spillway 134 is shown located on the third wall 104c; however, other configurations are envisioned to be within the scope of the disclosure. For example, in FIGS. 4, 5, and 6, the spillway 134 is shown located on the fourth wall 104d.

A filter 140 may be included in the first storage area 136 to drain the water, leaving only the floating portion 122 of the biomass 120 in the first storage area 136. Although the Figures depict the first storage area 136 as a container, embodiments according to the disclosure may include a ramp or other pathway for sorting the floating portion 122 of the biomass 120. The floating portion 122 may then be further processed, transported, stored, or sold. In most applications, the floating portion 122 will largely include bark.

A moving separation device 142 may be used to further separate the non-floating portion 126 of the biomass 120. In some embodiments the moving separation device 142 may be a conveyor having a plurality of openings 144. The openings may be sized so that they are smaller than the conditioned biomass 128 but larger than the debris 130. In some embodiments, the openings 144 may range from about 1/16 inch to about 1 inch. The openings 144 may be any suitable shape which allows passage of the debris 130 and prevents passage of the conditioned biomass 128. Although FIGS. 1-8 depict the moving separation device 142 as a conveyor, other types of devices (e.g., a screen, a permeable membrane) may be used in other embodiments.

As shown in FIGS. 1, 4, 7 and 8, the moving separation device 142 includes a first portion 146 which is below the water line 110 and a second portion 148 which is above the water line 110. Thus, the moving separation device 142 permits passage of the debris 130 within the non-floating portion 126 while the conditioned biomass 128 is moved to the second side 116 of the conditioning tank 102 and collected. This movement of the conditioned biomass 128 is indicated in FIGS. 2 and 5 by an arrow 150.

In some embodiments, the moving separation device 142 includes a skimming device 166. As shown in FIG. 3, the skimming device 166 may be attached to the moving separation device 142 so that it rotates with the moving separation device 142 and collects some of the non-floating portion 126 of the biomass 128 which is suspended in the water. The collected portion typically includes conditioned biomass 128, but may also include a small portion of debris 130. In the embodiment shown, the skimming device 166 is a mesh screen attached to the moving separation device; however, other types of skimming devices are within the scope of this disclosure. For example, the skimming device 166 may include a net, a filter, or another device known to a person of ordinary skill in the art.

The conditioning tank 102 may be equipped with a suction filter 152 which pulls the non-floating portion 126 of the biomass 120 toward the bottom portion 106 of the conditioning tank 102. The suction filter 152 may also be used to remove (e.g., pump out) the debris 130 from the conditioning tank once it has passed through the moving separation device 142. The suction filter 152 is shown in FIGS. 1-8 as being located on the second side 116 of the conditioning tank; however it may be possible to place the suction filter 152 on the first side 114 of the conditioning tank 102.

In the embodiments shown in FIGS. 7 and 8, the first portion of the moving separation device further includes a horizontal section 154 and an angled section 156. The horizontal section 154 may be arranged substantially parallel to the bottom portion 106 of the conditioning tank 102. The angled section 156 connects to the horizontal section 154 and is at least partially submerged in water. In some embodiments, the horizontal section 154 may be configured to vibrate, shake, or otherwise move in a manner that facilitates passage of the debris 130 through the openings 144.

In some embodiments, the containment device 112 may be equipped with one or more agitators 158 (visible in FIGS. 2 and 3). The agitators 158 may be rotary paddles, fins, or any other type of attachment which agitates the water. In some embodiments, the containment device 112 may be coupled to a motor (not shown) to rotate, vibrate, shake, or otherwise move the agitators 158. In some embodiments, the agitators 158 are rotated in a direction toward the second side 116 of the conditioning tank 102. Agitation is expected in aid in separation between the bark 124, conditioned biomass 128, and debris 130.

After the non-floating portion 126 is further separated into conditioned biomass 128 and debris 130, the conditioned biomass 128 is moved out of the conditioning tank into a second storage area 160. The second storage area 160 is located on the second side 116 of the conditioning tank 102. In the embodiments shown in FIGS. 1-3, 7, and 6, the second storage area 160 is adjacent to the third wall 104c. A divider 162 separates the first storage area 136 and the second storage area 160. In the embodiments shown in FIGS. 4, 5, and 6, the second storage area 160 is adjacent to the fourth wall 104d. In addition, other configurations and positions are possible.

A filter 164 may be included in the second storage area 136 to drain the water, leaving only the floating portion 122 of the biomass 120 in the first storage area 136. Although the Figures depict the second storage area 160 as a container, embodiments according to the disclosure may include a ramp or other pathway for sorting the conditioned biomass 128 collected. Thereafter, the conditioned biomass may be further processed, transported, stored, or sold.

If the conditioned biomass 128 collected is saturated with water, there may be a need to dry the material before it is moved to storage. Accordingly, the conditioned biomass 128 may be passed through a water removal device 168 (shown in FIGS. 2 and 3) before it moves into the second storage area 160. The water removal device 168 in FIGS. 2 and 3 is a cylindrical screen which rotates to dry the material inside. In other embodiments, the water removal device 168 may vibrate, shake, or operate via any mechanism for removing water that is known to a person of ordinary skill in the art.

Conditioning biomass according to embodiments of the disclosure is expected to clean biomass and to help remove undesirable materials which may cause problems in biomass applications. For example, when the biomass 120 is deposited into the conditioning tank, it may be approximately 80% woody material, 10% bark, and 10% debris. After passing through the system, the percentage of wood in the wood portion may be substantially increased. In addition, conditioning biomass according to embodiments of the disclosure may also be effective to reduce ash content in the wood. In some cases, it may be advantageous to debark the wood to save on chipping and pelletizing costs even if a low ash final product is not needed. The bark that is removed can be used for fuel in the drying process or sold as high value landscape bark. Conditioning biomass according to embodiments of the disclosure may also be useful in other applications or downstream uses including but not limited to heat generation, production of liquid fuel, production of biogas, bioelectricity generation, and production of feedstock for chemicals and other materials.

From the foregoing, it will be appreciated that the specific embodiments of the disclosure have been described herein for purposes of illustration, but that various modifications may be made without deviating from the disclosure. For example, the conditioning tank may include other shapes or configurations which are not explicitly illustrated. Aspects of the disclosure described in the context of particular embodiments may be combined or eliminated in other embodiments. For example, aspects disclosed in FIGS. 1, 2, and 3 may be combined with aspects disclosed in FIGS. 7 and 8.

Further, while advantages associated with certain embodiments of the disclosure may have been described in the context of those embodiments, other embodiments may also exhibit such advantages, and not all embodiments need necessarily exhibit such advantages to fall within the scope of the disclosure. Accordingly, the invention is not limited except as by the appended claims.

I claim:

1. A biomass conditioning system comprising:
   a conditioning tank having a bottom portion and a wall portion;
   a water input device configured to fill the conditioning tank with water to a water line;
   a biomass input device configured to deposit biomass into the conditioning tank and immerse the biomass in the water, thereby causing the biomass to separate into a floating portion and a nonfloating portion, the nonfloating portion comprising nonfloating biomass and debris;
   a containment device configured to:
      divide the conditioning tank into a first side and a second side; and
      contain the floating portion of the biomass in the first side of the conditioning tank;
   a spillway located on the first side of the conditioning tank, the spillway being configured to transfer the floating portion of the biomass to a first storage area; and a moving separation device at least partially submerged in the water, the moving separation device being configured to permit passage of the debris and to transport the nonfloating biomass out of the second side of the conditioning tank and into a second storage area.

2. The biomass conditioning system of claim 1, further comprising a suction filter configured to pull the non-floating portion of the biomass toward the bottom portion of the conditioning tank and to remove the debris from the conditioning tank.

3. The biomass conditioning system of claim 1 wherein the floating portion of the biomass comprises bark.

4. The biomass conditioning system of claim 1, further comprising a surfactant dispensing device configured to dispense a surfactant into the conditioning tank, the surfactant being effective to reduce surface tension of the water.

5. The biomass conditioning system of claim 1 wherein the moving separation device comprises a conveyor having a plurality of openings, the plurality of openings being sized to be larger than the debris and smaller than the nonfloating biomass.

6. The biomass conditioning system of claim 1 wherein the moving separation device comprises:
 a first portion below the water line; and
 a second portion above the water line, the second portion being located on the second side of the conditioning tank.

7. The biomass conditioning system of claim 6 wherein the first portion of the moving separation device comprises:
 a horizontal section that is arranged substantially parallel to the bottom portion of the conditioning tank; and
 an angled section that is at least partially submerged in the water.

8. The biomass conditioning system of claim 7 wherein the horizontal section is configured to vibrate or shake.

9. The biomass conditioning system of claim 1 wherein the containment device comprises a floating divider having one or more agitators, the one or more agitators configured to rotate, vibrate, or shake.

10. A biomass conditioning system comprising:
 a conditioning tank having a bottom portion and a wall portion;
 a water input device configured to fill the conditioning tank with water to a water line;
 a biomass input device configured to deposit biomass into the conditioning tank, the biomass including a bark portion, a conditioned biomass portion, and a debris portion;
 a floating divider which divides the conditioning tank into a first side and a second side, the bark portion of the biomass being contained in the first side of the conditioning tank;
 a spillway located on the first side of the conditioning tank, the spillway being configured to transfer the bark portion of the biomass to a bark storage area;
 a conveyor comprising:
  a first portion below the water line; and
  a second portion above the water line, the second portion being located on the second side of the conditioning tank;
  wherein the first portion of the conveyor and the second portion of the conveyor each have a plurality of openings, the plurality of openings being sized to permit the debris portion of the biomass to pass through the conveyor and sink to the bottom of the conditioning tank; and
 a suction filter located on the bottom portion of the conditioning tank.

11. The biomass conditioning system of claim 10, further comprising a surfactant dispensing device configured to dispense a surfactant into the conditioning tank, the surfactant being effective to reduce surface tension of the water.

12. The biomass conditioning system of claim 10 wherein one or more rotary paddles are attached to the floating divider, the one or more rotary paddles being configured to rotate toward the second side of the conditioning tank.

13. The biomass conditioning system of claim 10 wherein the wall portion comprises a first wall, a second wall, a third wall, and a fourth wall, the first wall being substantially parallel to the third wall, and the second wall being substantially parallel to the fourth wall.

14. The biomass conditioning system of claim 13 wherein:
 the biomass input device is located on the first wall;
 the floating divider extends from the first wall to the third wall;
 the spillway is located on the third wall; and
 the conveyor extends from the first wall to the third wall and at least a portion of the conveyor is in a slanted configuration with respect to the bottom portion of the conditioning tank.

15. The biomass conditioning system of claim 13 wherein:
 the biomass input device is located on the first wall;
 the floating divider extends from the second wall to the fourth wall;
 the spillway is located on the fourth wall; and
 the conveyor extends from the second wall to the fourth wall and at least a portion of the conveyor is in a slanted configuration with respect to the bottom portion of the conditioning tank.

* * * * *